(12) United States Patent
McKune et al.

(10) Patent No.: US 7,500,267 B2
(45) Date of Patent: Mar. 3, 2009

(54) SYSTEMS AND METHODS FOR DISABLING SOFTWARE COMPONENTS TO PROTECT DIGITAL MEDIA

(75) Inventors: Jeffrey R. McKune, Sammamish, WA (US); Chengyun Chu, Redmond, WA (US); James M. Alkove, Woodinville, WA (US); Sumedh Barde, Redmond, WA (US); Alexandre Grigorovitch, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 792 days.

(21) Appl. No.: 10/835,951

(22) Filed: Apr. 30, 2004

(65) Prior Publication Data

US 2005/0257251 A1    Nov. 17, 2005

(51) Int. Cl.
    G06F 7/04      (2006.01)
    G06F 17/30     (2006.01)
    G06K 9/00      (2006.01)
    H03M 1/68      (2006.01)
    H04K 1/00      (2006.01)
    H04L 9/00      (2006.01)
    H04L 9/32      (2006.01)
    H04N 7/16      (2006.01)

(52) U.S. Cl. .................................. 726/26; 713/165
(58) Field of Classification Search .............. 713/201
    See application file for complete search history.

(56) References Cited

U.S. PATENT DOCUMENTS

| 4,405,829 | A | * | 9/1983 | Rivest et al. | 380/30 |
| 5,050,213 | A | * | 9/1991 | Shear | 705/53 |
| 5,303,370 | A | * | 4/1994 | Brosh et al. | 380/51 |
| 5,509,070 | A | * | 4/1996 | Schull | 705/54 |
| 5,636,292 | A | * | 6/1997 | Rhoads | 382/232 |
| 5,638,513 | A | * | 6/1997 | Ananda | 726/5 |
| 5,715,403 | A | * | 2/1998 | Stefik | 705/44 |
| 5,721,788 | A | * | 2/1998 | Powell et al. | 382/100 |
| 6,298,446 | B1 | * | 10/2001 | Schreiber et al. | 726/27 |

(Continued)

OTHER PUBLICATIONS

Kuan-Ting Shen et al., "A New Digital Watermarking Technique for Video," *Recent Advances in Visual Information Systems*, 5th International Conference, VISUAL 2002, Proceedings, Hsin Chu, Taiwan, Mar. 11-13, 2002, 2314, 269-275.

(Continued)

*Primary Examiner*—Kambiz Zand
*Assistant Examiner*—Dant B Shaifer Harriman
(74) *Attorney, Agent, or Firm*—Woodcock Washburn LLP

(57) ABSTRACT

A list of computing components to be disabled can be distributed through a computer readable medium to computing devices. A process on these computing devices can read the list and disable listed components. The components can be permanently disabled, or disabled for a limited purpose. A list or list update may be provided with a digital media object that specifies a more or less stringent revocation policy for that object. A media object may also specify a maximum age for the list. This allows owners of digital media to control the stringency of media protection for their property. The process that accesses the list may prompt updates to the list, informing users of component disabling, and prompt replacement of disabled components. Finally, the invention provides techniques for securely transmitting and storing the list to protect it from alteration by unauthorized entities.

29 Claims, 9 Drawing Sheets

| Unique Identifier 300 | Revocation Scope 310 | Renewal URL 320 | x | y | z | n | Other Information 330 |
|---|---|---|---|---|---|---|---|
| Component A 301 | Global 311 | www.listorganizer.com 321 | | | | | |
| Component B 302 | Limited 312 | www.componentdeveloper.com 322 | | | | | |
| Component C 303 | Media Content Type 313 | www.componentdeveloper.com 323 | | | | | |
| Yu2#abc 304 | Media Source Type 314 | www.mediaobjectowner.com 324 | | | | | |
| GUID 305 | Other 315 | www.other.Com 325 | | | | | |
| List variation identifier 350 ||||||||
| Time of last list update T1 360 ||||||||

U.S. PATENT DOCUMENTS

2005/0138406 A1* 6/2005 Cox ........................... 713/200

OTHER PUBLICATIONS

Lotspiech, J. et al., "Broadcast Encryption's Bright Future," *Computer*, 2002, 35(8), 57-63.

Memon, N. et al., "Protecting Digital Media Content," *Communications of the ACM*, 1998, 41(7), 34-43.

Ripley, M. et al., "Content Protection in the Digital Home," *Intel Technology J.*, 2002, 6(4), 49-56.

Steinbach, M. et al., "Digital Watermarking Basics—Applications—Limits," *NFD Information—Wissenschaft und Praxis*, Jul. 2002, 53(5), 261-268.

* cited by examiner

| Unique Identifier 300 | Revocation Scope 310 | Renewal URL 320 | x | y | z | n |
|---|---|---|---|---|---|---|
| Component A 301 | Global 311 | www.listorganizer.com 321 | | | | |
| Component B 302 | Limited 312 | www.componentdeveloper.com 322 | | | | |
| Component C 303 | Media Content Type 313 | www.componentdeveloper.com 323 | | | | |
| Yu2#abc 304 | Media Source Type 314 | www.mediaobjectowner.com 324 | | | | |
| GUID 305 | Other 315 | www.other.Com 325 | | | | |
| List variation identifier 350 | | | | | | |
| Time of last list update T1 360 | | | | | | |

Other Information 330

*Fig. 3*

Other Information 430

| Unique Identifier 300 | Renewal URL 320 | x | y | z | n |
|---|---|---|---|---|---|
| Component A 301 | www.listor-ganizer.com 321 | | | | |
| Component D 406 | www.com-ponentdev-eloper.com 426 | | | | |
| Component E 407 | www.com-ponentdev-eloper.com 427 | | | | |
| Component F 408 | www.media-object-owner.com 428 | | | | |
| Component G 409 | www.other. Com 429 | | | | |
| List variation identifier 450 | | | | | |
| Time of last list update T1 460 | | | | | |

Global Revocation List 470

Other Information 431

| Unique Identifier 300 | Renewal URL 320 | x | y | z | n |
|---|---|---|---|---|---|
| Component B 302 | www.com-ponentdev-eloper.com 322 | | | | |
| Component M 410 | www.com-ponentdev-eloper.com 413 | | | | |
| Component N 411 | www.media-object-owner.com 414 | | | | |
| Component O 412 | www.other. Com 415 | | | | |
| List variation identifier 451 | | | | | |
| Time of last list update T1 461 | | | | | |

Limited Revocation List 471

*Fig. 4*

SYSTEMS AND METHODS FOR DISABLING SOFTWARE COMPONENTS TO PROTECT DIGITAL MEDIA

FIELD OF THE INVENTION

This invention relates to computing, and more specifically to the protection of digital media, also referred to as digital rights management.

BACKGROUND OF THE INVENTION

The proliferation of personal computers and handheld digital devices has opened a vast market for digital media. Many forms of media formerly available through conventional channels, such as books, photographs, paintings and illustrations, music, and motion pictures are now available in digital form.

The digital format presents both challenges and opportunities for those who invest in media production, the content owners. Digital media can be cheaply copied with a high degree of accuracy. It can be distributed over high-speed computing networks without regard for geographic boundaries. Copying and redistribution of digital media via the internet is rampant, despite often clear violations of copyright law. The music file sharing made popular by the now famous early NAPSTER® software is an example of the scope of potential digital file sharing that may occur, and the damage that such file sharing can visit upon producers of digital media content.

The potential deterioration of content owners' investments in digital media can give rise to reluctance in entering the digital marketplace. As digital networks continue to expand, however, consumers are coming to expect the convenience of a digital media experience. Consumers may be dismayed or deterred from purchasing media that is not available on-line. In short, as market demands for digital media continue to expand, the question is how to make media available in a digital format, not whether do so.

Software developers are therefore asked for solutions to the problems presented by digital media. While software developers support the expansion of digital media content, they are reluctant to limit the features of their products for the sake of digital media protection. Purchasers of software products have a selection of products that they can choose from, and they generally want maximum flexibility and power from their software. Purchasers do not wish to be restrained in the use of their computing devices by security features designed to protect content owners.

A number of attempts at protecting digital media have been made, with varying degrees of success. One notorious attempt was that of the Motion Picture Association of America (MPAA) to protect movies distributed as Digital Versatile Disks (DVDs). An industry-wide encryption algorithm was developed, called the Content Scrambling System (CSS). Most movies made available as DVDs were encrypted using CSS, and all DVD player devices were equipped with the ability to decrypt movies stored in this format. However, in an act widely attributed to a Norwegian teenager named Jon Johansen, a computer process capable of decrypting CSS was published on the internet in 1999. Using this program, called DeCSS, a DVD movie can be decrypted and stored in a standard file format. This file can be manipulated, stored, and exchanged in an unencrypted format.

While encryption has played a pivotal role in attempts to protect digital media, such media is vulnerable regardless of whether an encryption algorithm is cracked and published on the internet. Eventually, digital media that is distributed to consumers must be decrypted and exposed to those consumers. The decrypted signal can be intercepted by rogue computing components, i.e., software or hardware components that are designed or altered to perform such interception.

In response to the weakness of systems such as CSS, and other forms of digital media protection susceptible to interception, software products such as the MICROSOFT WINDOWS® family of operating systems have incorporated technology to further protect digital media. Such software is generally provided for personal computers (PCs), and so is explained here in that context. One system designed to provide such further protection is illustrated in FIG. 1.

FIG. 1 illustrates an exemplary computing environment that will be familiar to those of skill in the art. In general, this environment is separated into an application process space 108 and a protected process space 109. The protected process space 109 represents a protected memory space that cannot be accessed by unprivileged software. Application process space 108 represents memory space that can be manipulated by everyday applications 103, 104, and other software components, e.g., computing components 106 located in application process space 108. The applications 103, 104 can request services from an operating system via available Application Programming Interfaces (APIs) 102. The separation of the protected process space 109 and the application process space 108 helps to ensure that applications 103, 104 will not perform operations that destabilize the implemented protections.

In the computing environment of FIG. 1, a secure system is implemented in the protected process space 109 to access and replay media objects such as 100. The gray color in FIG. 1 designates technology that is designed to help protect digital media 107. Therefore, the media object 100 has a gray border, indicating that it is encased with some form of protection, such as encryption. The gray digital media access platform 101 and secure digital media playback service 105 are equipped with technology designed to securely unpack and render the protected media object 100. In this regard, a digital media object 100 can be processed by a secure digital media access platform 101 in protected process space 109 that may wholly or partially decrypt a media object 100. Media object 100 can then be passed to a secure digital media playback service 105 for further processing and for rendering the media object 100 into a consumable form. The path that a media object 100 takes from its original location to rendering is sometimes referred to as a Protected Media Path (PMP).

The system of FIG. 1 provides protection for media objects beyond encryption itself by unpacking and rendering a media object 100 in a secure environment. Ultimately, however, a configuration such as FIG. 1 shares a weakness similar to that of the bare encryption approach implemented by CSS. That is, both approaches are passive. While they present formidable barriers to unauthorized access of media objects, over time computing components can be discovered or created that overcome such barriers and compromise protected media objects 100. For example, components may be developed that are capable of peering into the protected media path to identify encryption keys and authentication algorithms. This is especially true when a system is provided in which the digital media access platform 101 is extensible—i.e., when third parties are permitted to develop tools, such as 106b, sometimes called "plug-ins" that can be used in conjunction with 101.

In FIG. 1, the black boxes 106 in both the protected process space 109 and the application process space 108 are computing components 106 on a computing device. The components 106 in the digital media access platform 101 may be referred to as "plug-ins" that perform features for the manipulation of media objects 100. These plug-ins, as well as all other components 106, are desirable to purchasers of software because they provide additional power and flexibility in manipulating digital media objects 100. However, some of the components 106 may be discovered to present a security risk. Other components 106 may be solely designed to gain unauthorized access to media objects 100, and serve no other useful purpose. For example, imagine that component 106a is a software component that bears the DeCSS program for breaking CSS protection on a DVD.

Therefore in addition to the historically passive approach to protecting media objects, which allows for eventual development of components that compromise protections on media objects and/or compromise protections implemented by digital media platforms, a lack of flexibility in media object protection is a shortcoming in the industry. The systems described above present a one-size fits all approach to protecting media when in reality various components 106 pose different levels of risk to media objects. Also, users of computing devices have differing needs that translate into differing tolerance levels for restriction in computing flexibility and power. Moreover, all digital content is not created equal, some content merits very strict protection while other content merits no protection at all. Content owners have different levels of risk that they are willing to tolerate with regard to their digital media.

In light the problems explained above, there is an unaddressed need in the industry to provide for more active protection of digital media objects that retains flexibility and power in software programs while simultaneously allowing content owners to achieve a desired level of security.

SUMMARY OF THE INVENTION

A list of computing components to be disabled can be distributed through a computer readable medium to computing devices that access digital media objects. A process performed by these computing devices can read the list and disable the components on the list. The list can provide for global revocation, or disabling a component for all media objects, but it can also provide for more flexible revocation. The list may also provide for flexible distribution and updating. The list can be distributed and updated by an organization responsible for maintaining the list. Supplemental lists or list updates may also be provided with digital media objects to specify more or less stringent revocation policies for individual media objects. A media object may also specify a maximum age for a list, requiring that a list has been updated within a specified time interval. This allows owners of digital media to control the stringency of media protection for their property. Further, the process on computing devices that accesses the lists may comprise functions for facilitating the use of the list, such as prompting updates to a list, informing users of component disabling, and prompting replacement of disabled components. The invention may further utilize techniques for securely transmitting and storing the lists to protect them from alteration by unauthorized entities. Techniques for certifying and identifying components are provided as an additional check on components and as a way to uniformly identify components for a list.

BRIEF DESCRIPTION OF THE DRAWINGS

FIG. 3 illustrates an exemplary list indicating unique identifiers for components to be disabled, as well as additional information as necessary or convenient.

FIG. 4 illustrates a preferred embodiment of the invention in which multiple lists are used. A global revocation list, on the right, can apply to all components, while limited lists, such as the list on the left, apply only to media objects that are associated with the limited list.

DETAILED DESCRIPTION OF ILLUSTRATIVE EMBODIMENTS

Certain specific details are set forth in the following description and figures to provide a thorough understanding of various embodiments of the invention. Certain well-known details often associated with computing technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Overview of the Invention:

The following brief overview will describe the invention in general. More detail about the aspects discussed here, as well as additional aspects of the invention and implementation information may be found in the detailed description of various embodiments, below.

Figure 2:
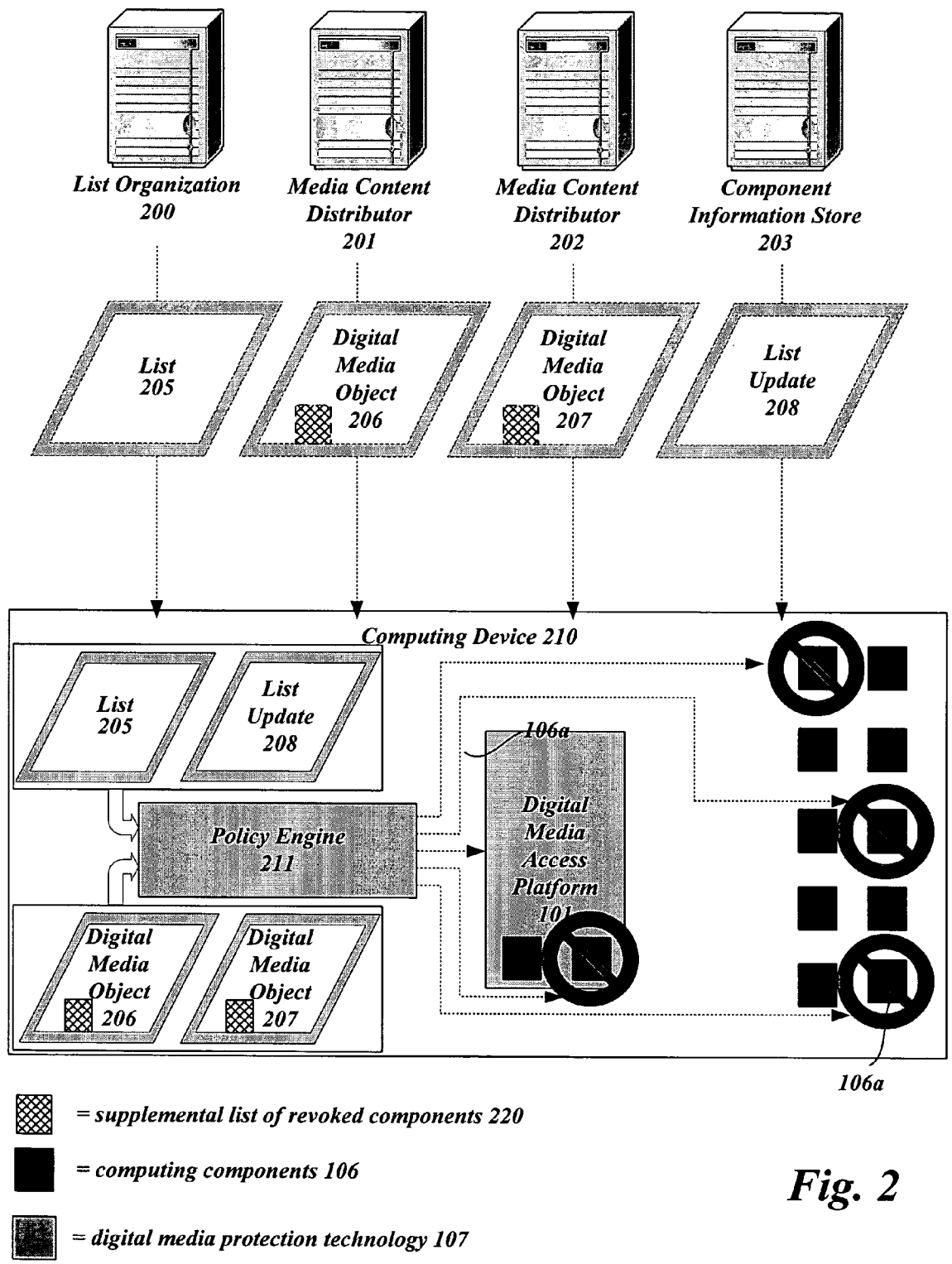
FIG. 2 illustrates an overview of the invention, with a list 205 that is downloaded from a list organization 200 to a computing device 210, wherein the components, e.g., 106a on the list 205 as well as additional components from supplemental lists 220 associated with media objects 206, 207 are disabled by a policy engine 211. Also, list updates 208 are depicted in FIG. 2.

An illustration of many aspects of the invention and how they relate to one another is provided in FIG. 2. A list of computing components 205 to be disabled can be distributed through a computer readable medium to computing devices such as 210 that access digital media objects 206, 207. A process 211 on these computing devices 210 can read the list 205 as well as any supplemental lists 220 and disable the components on the lists 205, 220, e.g., component 106a. The process 211 can ensure that all components 106 specified on the lists 205, 220 are disabled prior exposing a digital media object, e.g., 206 to the operation of such components.

The list 205 can provide for global revocation, or disabling of a component for all protected media objects, but it can also provide for more flexible revocation. Components 106a on the list may be marked for temporary revocation, in which they are disabled for a limited time only. They can also be marked for content-specific revocation, in which they are disabled only when a particular type of media content is accessed, for example, music media objects. They can also be marked for media object-specific revocation, disabling only for access to a particular media object e.g., digital media object 206, or media object source-specific revocation, disabling only for access of media objects from a particular source, e.g., media content distributor 201. After disabling components as specified on the list 205, as updated 208, and with any supplemental lists 220, a media object 206, 207 can be processed by the digital media access platform 101 for use by applications and enjoyment of users in the usual way. These processes are left out of FIG. 2 for clarity of illustration.

In addition to flexible revocation, the list 205 may provide for flexible distribution and updating. The list 205 can be distributed and updated by an organization responsible for maintaining the list 200. It can also be distributed or updated by other organizations with permission to do so 203. A supplemental list 220 may be provided by a digital media object 206, 207 that specifies a more or less stringent revocation policy for that object 206 or 207, or for other objects from the same source 201 or 202. A media object 206 or 207 may also specify a maximum age for the list 205, requiring that a list 205 used by a computing device 210 has been updated within a specified time interval. This allows owners of digital media to control the stringency of media protection for their property e.g., 206. Controls may be added to the list 205 specifying which components 106 may be revoked, and a type of revocation that is permitted from those allowed to update the list, e.g., 201, 202, 203, and 204.

Further, the process 211 on a computing device 210 that accesses the list 205 may comprise functions for facilitating the use of the list 205 and 207, such as prompting updates to the list, informing users of component disabling, and prompting replacement of disabled components. Several techniques for prompting a user to update the list are provided, in addition to automatic and transparent updates. The process 211 may also inform users prior to disabling a component 106a, and give users a choice of whether to disable a component 106a or forego access to a media object 206, 207. The list 205 may contain a Uniform Resource Locator ("URL") for replacing a component 106a, and the process 211 may prompt users to visit the URL to replace a disabled component 106a.

The invention utilizes techniques for securely transmitting and storing the list 205 to protect it from alteration by unauthorized entities. Secure data transmission and storage techniques are understood in the art, and the invention is not limited to any such technique, however an existing secure transmission technique, called the "secure clock" technique, is suggested for preferred embodiments. This technique comprises retrieving a secure clock time, T2, from a trusted source, e.g., 203, and comparing it to a secure clock time stored with a list 205, T1. If it is determined that an update is needed, T1 can be sent along with other identifying information to the trusted source 203. The trusted source 203 may then return a list update 208 along with a new clock time, T3, and the original clock time, T1. T1 may then be verified by the recipient to determine if the trusted source 203 was compromised.

Finally, techniques for certifying and identifying components 106 are provided as an additional check on components 106 and as a way to uniformly identify components 106 for the list 205. A unique identifier can be assigned to all components 106. This identifier may be created by an owner or creator of a component. This person may then certify the unique identifier with an organization responsible for maintaining the list, by agreeing that the identifier used is truly unique, and that the component does not have properties that can be used to compromise digital media protection technology. This can be double-checked by the certifying organization, and the unique identifier may then be used to identify the component. If the component is determined to allow circumvention of digital media protection technology, its unique identifier can be listed and the component can be disabled as described above.

Detailed Description of Various Embodiments

The following detailed description will generally step through the above overview of the invention and provide additional explanation of the concepts and features presented. Additional aspects of the invention and implementation information will also be provided as necessary.

A computing component is any discrete piece of computing software or hardware. A brief general description of a computing device suitable for use with the invention is provided at the end of this document. Many of the elements described in connection with FIG. 10 and the corresponding description are components. The majority of components may be software components designed using modern object-oriented programming techniques, or pieces of software code such as a Digital Link Library ("DLL"). Computing components for use in a digital media rendering system are often referred to as "plug-ins." Other components are sometimes referred to as program modules.

Disabling a component refers to restricting or completely blocking the use of the component on a computing device. Disabling as used in this document therefore refers to a broad range of potential actions, unless the term is further limited to describe a particular kind of disabling. Disabling can be as drastic as permanent global disabling of a component for all purposes, such as erasing a software component from all forms of computer memory and prohibiting its reinstallation for any reason. Disabling can also be more unobtrusive, for example by temporarily restricting a component or a subset of component functions from engaging in specified actions for a limited time, or temporarily restricting a component from operating on a specified digital media object. The term disable and the term revoke are synonymous herein.

Two types of revocation are frequently referred to in this specification. Global revocation, as used here, refers to permanently revoking a component for all protected media objects. An object that has been globally revoked is no longer allowed to operate when any protected media object is accessed by the digital media access platform 101. Limited revocation refers to completely disabling a component while a particular media object is operated upon by a computing device, and subsequently allowing the component to resume normal functions. A component that is the subject of limited revocation is not accessible for any purpose while a particular media object is manipulated by digital media access platform 101, but after the media object is safely removed from active operations the component is permitted its full range of normal operations. Limited revocation may also be referred to herein as exclusion.

A digital media object will be referred to occasionally as a media object. A digital media object is a discrete digital representation of consumable media. Motion pictures, songs, books, essays, illustrations, photographs, and databases or useful collections of data are all capable of being stored digitally, and as such may take the form of digital media objects. A wide variety of digital file formats are available for such media objects, such as the familiar wave (".wav") and MPEG Audio Layer-3 (".mp3") format for songs, the document (".doc") and Rich Text Format (".rtf") for written documents, the Tag Image File Format (".tiff") and Joint Photographic Experts Group (".jpeg") formats for digital images, and so on. In general, media objects are stored in some form of computer readable medium. A computer readable medium is any medium that is capable of storing or transmitting signals that may be interpreted by a computing device. Typical computer readable media are floppy disks, digital versatile disks ("DVDs"), compact disks ("CDs"), as well as cables, wires, and electromagnetic radiation traveling through the air that transmits electronic signals. Computer readable media are further described at the end of this document in connection with the exemplary computing device.

Various embodiments of a list suitable for use with the invention are provided in FIG. 3. Referring to FIG. 3, a list is shown in a table format. It will be understood that a table is not required, and instead components and any related information could be lumped into a single column. The table provides a column for unique identifiers 300, in which information used to uniquely identify components can be placed. Identifiers in the unique identifier column 300 may also uniquely identify groups of components, for example any component from a particular source. The unique identifiers in FIG. 3 are illustrated as "component A," 301, "component B," 302, and so on. Strings of numbers, text, symbols, and so on can also be used, such as the string "Yu2#abc" 304. In a preferred embodiment, Global Unique Identifiers ("GUIDs") 305 made popular by MICROSOFT corporation can be used as unique identifiers of components for the list.

A revocation scope column 310 can be provided that defines the revocation characteristics for the corresponding component. For example, a component may be marked for global revocation 311, such as Component A 301. Component B 302 is marked for limited revocation 312. Component C 303 is marked for "media content type" revocation 313. Imagine, for example, that Component C actually uniquely identifies a class of media objects, for example, movies, or music files, or files stored in a .jpeg format. A revocation may be applied to such a class using a media content type revocation 313. The Yu2#abc 304 component is marked for media source type revocation 314. This revocation 314 can be used to disable the corresponding component 304 for all media objects from a specified source. Finally, any other type of revocation 315 can be identified in the revocation scope column 310. There may be many revocation nuances that are contrived for various situations, and any such nuances can be specified in one or more revocation scope 310 columns.

A renewal URL column 320 may be provided to provide information for renewing components that are marked for global revocation. While FIG. 3 uses the familiar world wide web ("www") URLs to suggest locations for replacement components, any location may be specified in such a column, including an intranet or network location, or even a telephone number or street address. The purpose of such a column 320 is to facilitate accessing replacement components for users of computing devices that are subject to component revocation.

A world wide web location may provide a convenient way to replace software components that have been globally revoked. For example, a URL in the renewal URL column 320 may specify an internet location for a list organization such as 200 from FIG. 2 that was responsible for revoking a component. This is suggested by element 321 in FIG. 3. The list organization 200 can provide a new component, or can redirect the computing device to a location that is able to provide a new component. Likewise, the list may provide a direct link to a component developer, as in 322, or a link to a media object owner or some other entity responsible for revoking a component, as suggested by 324 and 325.

Finally with regard to the columns of FIG. 3, any number of additional columns, x, y, z, and n may be provided to give other useful information 330 with regards to the components on the list. Some exemplary information that could be stored in such columns is a plain English description of the component and its function. In a situation where the user of a computing device is prompted to revoke a component on the list, the user may benefit from the availability of such a description. Also, if multiple organizations are allowed to provide updates to the list, there may be certain components that are identified as only to be updated by a specific organization, such as list organization 200 from FIG. 2.

The list of FIG. 3 may also indicate a time of last update T1 360. Because new discoveries regarding the security of components are constantly made, a recent revocation list will provide greater security than an old, or stale, revocation list. Even if the list does not change, content owners may want to be assured that the computing devices that replay their media objects bear the most up to date list.

The acceptable staleness of a list may be related to the value of the media object. Highest valued content—for example a high definition movie that has recently been released to the big-screen theaters market, may require a check for an updated list just before rendering the content. Medium valued content—for example standard definition movies that have recently been released to the DVD home-video market may require a list that is no more than one month old. Lower valued content—for example protected content that is also available in unprotected formats, such as "redbook audio" content, may never force a list update.

The list of FIG. 3 further includes a variation identifier 350. The variation identifier may be used in updating the list and to provide easily accessible information about the properties of a list. Use of the variation identifier will explained below in connection with performing secure updates to the list.

In lieu of providing a single master list that provides all component, revocation, replacement and other information, multiple lists can be provided. For example, in various preferred embodiments of the invention, a revocation scope column 310 is not employed. Instead, a global revocation list 470 may be provided by an organization responsible for maintaining such a global revocation list 470, such as List Organization 200 from FIG. 2. A global revocation list 470, illustrated on the left hand side of FIG. 4, contains only unique identifiers for components that will be globally revoked. Component A 301, component D 406, component E 407, and so on are on the global revocation list 470 and therefore are designated for global revocation.

Further with respect to FIG. 4, any number of limited revocation lists, such as limited revocation list 471, may be provided by owners and distributors of media objects. These may be provided, for example, as supplemental lists 220 bundled with digital media objects 206, 207 as illustrated in FIG. 2. Limited revocation lists 471 contain only components that are designated for limited revocation. Therefore component B 302, component M 410, component N 411 and component O 412 are all designated for limited revocation.

Bifurcation of the globally revoked components and the limited revoked components, as in FIG. 4, allows for flexible and secure use of the invention. Global revocation of a may have serious consequences for a computing device, and therefore it may not be advisable to allow global revocation powers to a broad group of actors. Limited revocation, however, applies only to a media object that specifies components to be revoked for that object. Therefore limited revocation need not have consequences for a computing device beyond the replay of the particular media object for which the revocation is requested. By bifurcating global and limited revocation, a list organization 200 can ensure a generally secure environment to prevent unauthorized access to most media objects, while media object owners and distributors can increase the security level for their own media objects without negatively affecting the normal functions of a computing device.

Figure 5:
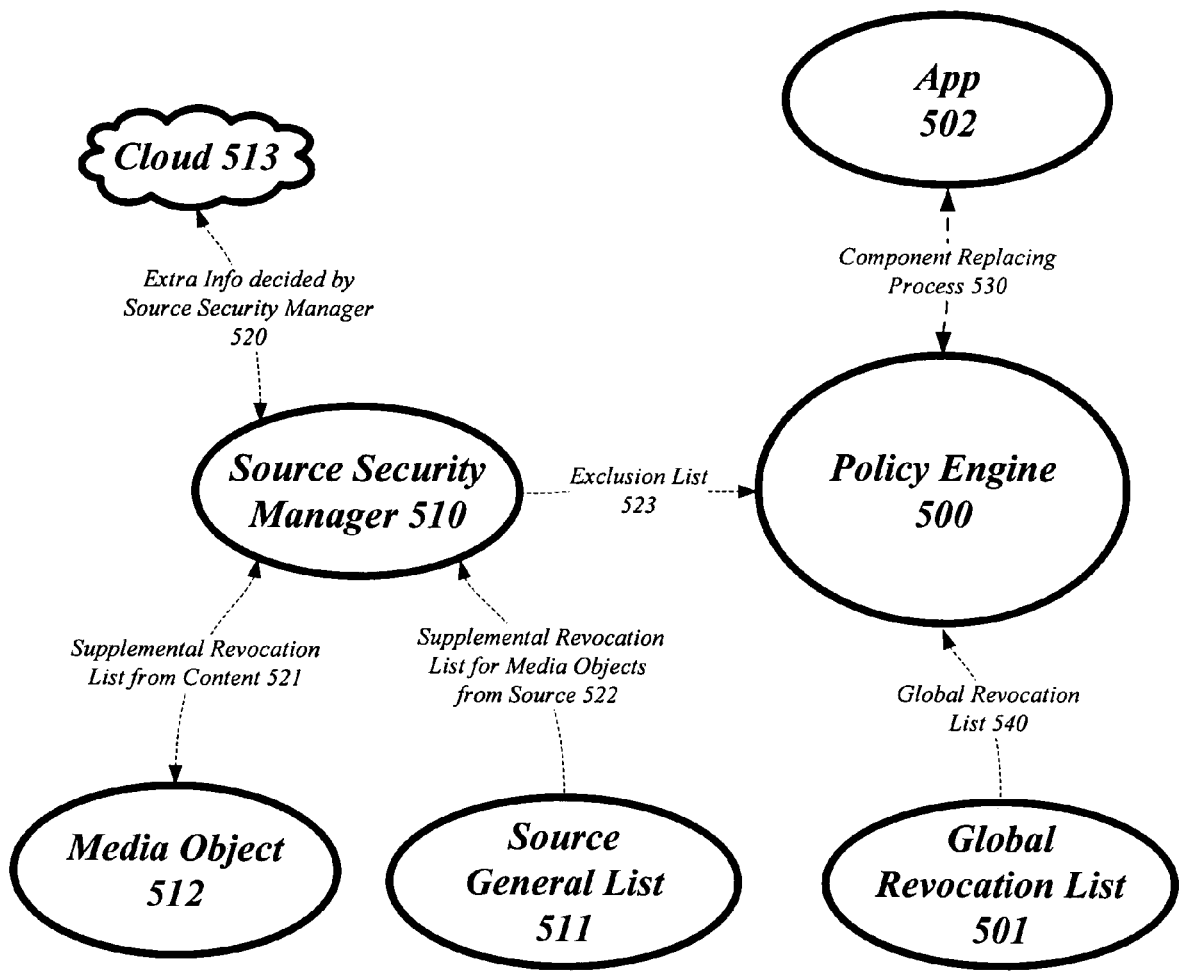
FIG. 5 illustrates an additional security feature of the invention in which media content owners can specify their own lists based on a variety of informational sources, and pass the list to a policy engine 500 to be enforced alongside a global revocation list.

FIG. 5 illustrates an exemplary technique for enforcing the multiple lists of FIG. 4. FIG. 5 can be best understood by first referring briefly to FIG. 2. A list 205, as updated 208, along with any supplemental lists 220 can be enforced by a policy engine 211 process that disables the components, e.g., 106a on the lists 205, 208, 220. This can be done before a media object 206 or 207 is passed to the platform 101, and thereby exposed to the operation of the various components 106.

Content owners can provide a source security manager 510 to ensure that components are revoked prior to allowing access to a media object 512. The source security manager 510 can be tailored to the needs of content owners. In this regard, it can read a supplemental list 521 from a media object 512. It can also read any additional lists, such as a source general list 511 that specifies components to be disabled for all media objects from the source. Further, the source security manager can access other information 520, as desired, to determine any other components that should be disabled prior to replay of a particular media object 512. After a determination of all components to be disabled, an exclusion list 523 can be passed to the general policy engine 500.

The general policy engine 500 can enforce the exclusion list 523 as well as the global revocation list 501 that applies to all media objects. It can interface with applications 502, as necessary, to inform a user of a computing device of revoked components and to prompt a user to replace any components 530. Once the computing device is prepared to render a media object 512, it can inform the source security manager 510, and the source security manager may pass the media object 512 to the policy engine.

Figure 6:
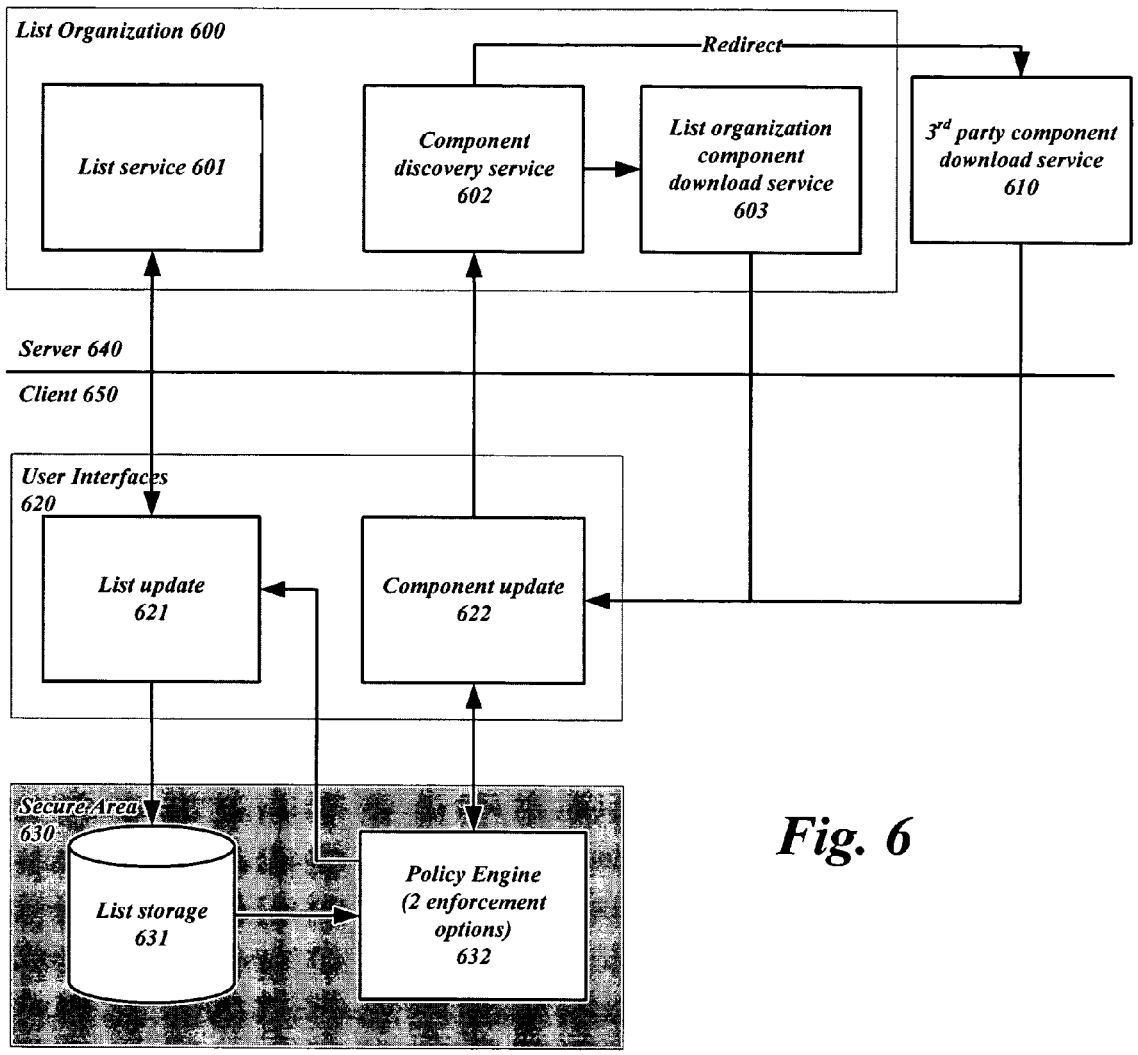
FIG. 6 illustrates an interaction between a client 650 and server 640 when a client 650 retrieves updated lists, and also when a client 650 retrieves replacement components for components that have been disabled. Interactions between exemplary processes on both the client 650 and server 640 are also shown.

Various functions of a policy engine 632 are illustrated in FIG. 6. The policy engine 632 is responsible for reading and enforcing the component revocations specified on a global or a supplemental list. This involves comparing any components on a list to each component that may interact with a media object. Two or more different enforcement experiences may be provided, depending on whether a listed component is optional or required for access to a desired media object. If a component is optional, the component update user interface can indicate it is disabled, the component transform can be excluded from the process and the media object can continue to play. If the component is required, the user is notified, the component is excluded from the process and the media object can be skipped, i.e., blocked from replay. After a replacement component is found and installed, the user may again attempt to access the desired media object.

Pursuant to enforcing the lists, a policy engine 632 may also update the lists and the disabled components. These processes are illustrated in FIG. 6. Note that while any list may be updated by a policy engine 632, in preferred embodiments media objects specify their own list of components to be excluded, and perhaps also a freshness level for a global revocation list. In such a configuration, only global revocation lists may be updated.

There are a variety of ways to trigger a list update. In various embodiments, an operating system such as MICROSOFT WINDOWS® can periodically check for an updated global revocation list. Source security managers, which may also be referred to as source trust authorities, can also trigger an update by requiring an updated list. An update may be performed automatically, or a user can be provided with the option to refuse to check or update the global revocation list. If a user refuses to perform an update, content that requires an updated list will not play.

Once an update is triggered, the processes indicated in FIG. 6 can take place. First, the policy engine 632 can initiate a list update UI 621. This can inform the user of a computing device that a list update is pending, and provide an opportunity to decline the update. The user may be allowed to specify how and when they want to update a list. For example, the user may specify to never check for updates, or to check for updates periodically and notify the user. In this latter case, a search for an updated list from the list organization 600 list service web site 601 can be made when the user is online. If a new list is available, an icon could appear on the user's desktop indicating a new list is available. A user may also be allowed to specify automatic updates to the list. When the user is online, an updated list if one is available can be automatically downloaded from the list organization 600 list service web site 601. Updates can be securely stored in the list storage 631.

Components that have been placed on a global revocation list may be replaced by the policy engine 632 process by launching a replacement UI 622 for a user of a computing device. The UI can notify a user that a component is revoked. It may also provide further information to the user, describing when a component was revoked, the revoked component DLL name, who revoked the component, and whether the revocation was global, limited, or for all content from a specified source. A user may further be informed of whether a component is necessary for a media session, the location to replace the revoked component, and so on. In this regard, an 'update now' and a 'more info' button can be a part of the UI. 'More info' can take a user to a web page that describes the problem and the steps a user can take to resolve it. 'Update now' can take a user to a download experience to replace the component.

The download experience can first access a component discovery service 602. This service 602 can use the unique identifier from a list to determine which components are to be replaced. Once such a determination is made, the service may download a replacement component directly to the client 650 through a list organization component download service 603. Otherwise, the list organization may redirect the client 650 to a third party component download service 610. By maintaining a list of the locations where components are available, the list organization 200 can ensure that the client 650 is not directed to out of date or incorrect internet locations. Upon completion of the component download process, the component update UI 622 can prompt the user to install the replacement component, or the replacement component can be automatically installed by the policy engine 632.

In connection with the download of updated lists, note that updates to lists may come from any source, not only a centralized list organization. In this regard, FIG. 2 shows a list update 208 coming from a separate component information store 203. This separation of the list originator 200 and the list updater 203 in FIG. 2 is intended to suggest that list updates may come from any trusted source. However, in preferred embodiments it may be more efficient for a single organization, such as 200, to both originate and update the list 205.

Various preferred embodiments will provide for secure transmission and storage of a list to prevent tampering. If a list is tampered, components that should be disabled may not be, thereby compromising the security of the media objects that the invention is designed to protect. Also, as new information is discovered, potential security loopholes are uncovered, and so updates to a list may be available periodically. These updates should be secure to prevent tampering. Such updates may be available at any interval, although experience has shown that monthly updates provide a satisfactory interval for a global revocation list. If no new components are added to a list, a blank update can be provided to client devices to satisfy freshness requirements of content owners.

Figure 7:
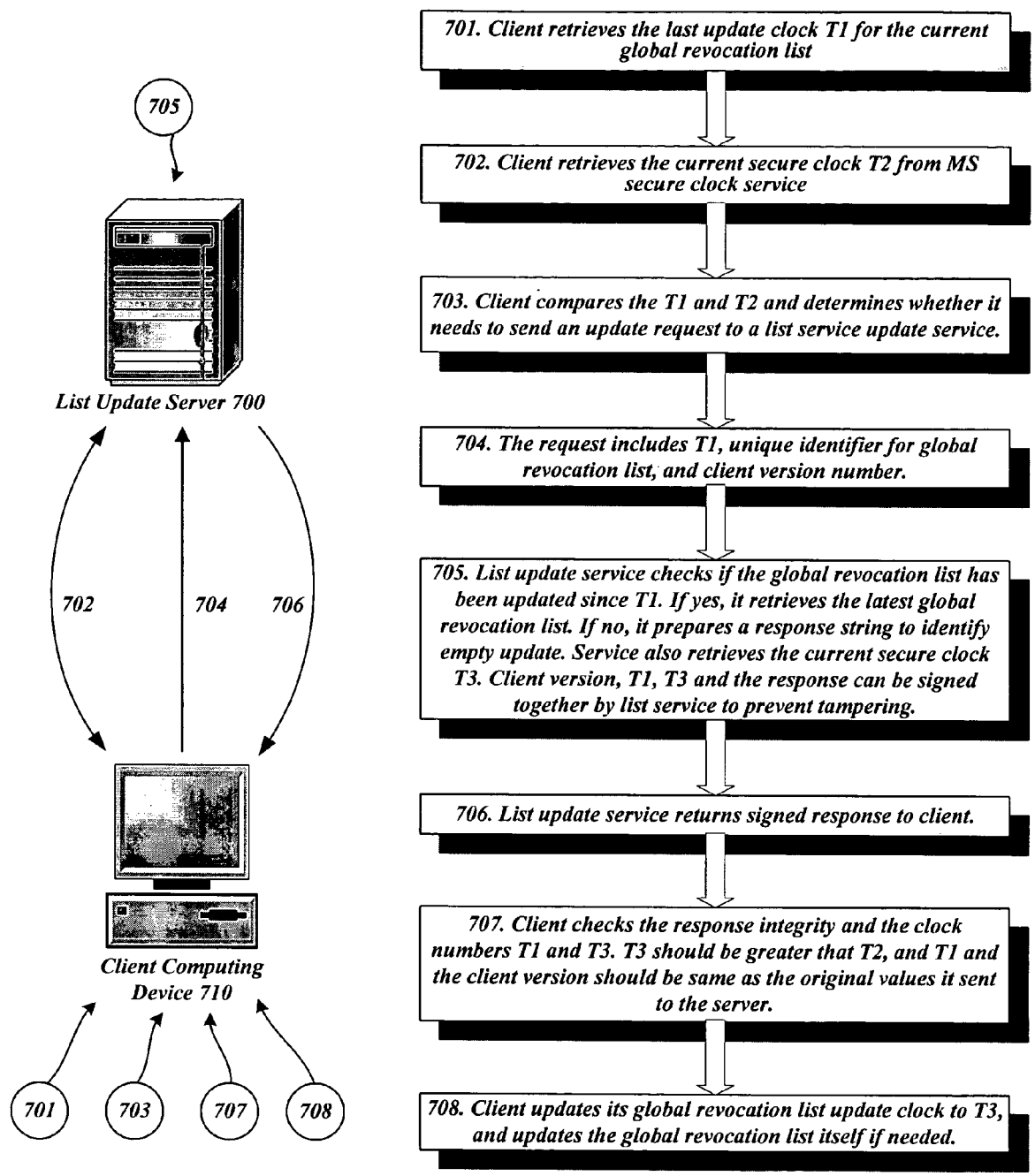
FIG. 7 illustrates an exemplary protocol for retrieving an updated list.

There are various techniques for securely transmitting and storing data that are known in the art, and any such technique can be used. A preferred method for transmitting the list is known as the secure clock method. This method has the advantage of thwarting replay attacks, man-in-the-middle attacks, and clock rollback attacks. Using this technique, communication between a client 710 and an update server 700 engages in the process illustrated in FIG. 7. First, a client computing device 710 retrieves the last update clock T1 for a current global revocation list it has 701. Next, client 710 retrieves 702 a current secure clock T2 from a list service secure clock service 700. Next, client 710 compares T1 and T2 and determines 703 whether it needs to send an update request to a list service update service 700. Such a request, if sent, can include T1, a unique identifier such as a GUID to identify a global revocation list, and a client version number. The list service update service 700 then gets the client's 710 request and its current freshness clock T1. It checks if the global revocation list has been updated since T1 705. If yes, the list service 700 can prepare to send the latest global revocation list back to client 710. If no, the list service 700 can simply prepare to send a response string to identify empty update. The list service 700 can also retrieve 705 a current secure clock time T3. Client version, T1, T3 and the response can be signed together 705 by the list service 700 to prevent tampering. This signed package can be sent 706 to client 710.

When the client 710 gets the response, it can check 707 the response integrity and the clock times T1, T3 it contains. T3 should be greater that T2, and T1 and the client version should be same as the original values the client 710 sent to the server 700. This is to prevent man-in-the-middle and clock rollback attacks. Finally, the client 710 can update 708 its global revocation list's last update clock to T3 and update 708 the global revocation list itself if needed. Those of skill in the art will understand that other secure protocols, and variations of the above protocol, are feasible and may be desirable in certain situations to provide for the secure update of a list.

Note the use of a client version number. This allows a list service 700 to update the distribution mechanism for future distributions to client 710. For example, a list service 700 may begin by only conducting complete or empty revocation lists to the client. But if later a list service 700 determines that download of a full revocation list is too big, it may design a delta mechanism to send only a update portion of a global revocation list. If so, the new client 710 can be assigned a different version number.

After successful transmission, the list may be stored in any location. If it is signed, it need not be stored in a secure location, because it can be verified every time it is accessed. Alternatively, it can be placed in a secure store that is not subject to file rollback attacks, to ensure that revoked components stay revoked.

The above description explains in detail the various embodiments of a list, including various types and sources for lists and processes for enforcing and updating such lists. The following brief description will be directed to techniques for generating such a list by a list service, such as list service 200 from FIG. 2. In general, this process comprises generating a unique identifier for components 106 that may operate on a computing device in connection with media objects 206, 207. Additional features are provided whereby components can also be certified for safety by a list organization. In various preferred embodiments, only certified components may be allowed to operate in connection with media objects.

Figure 8:
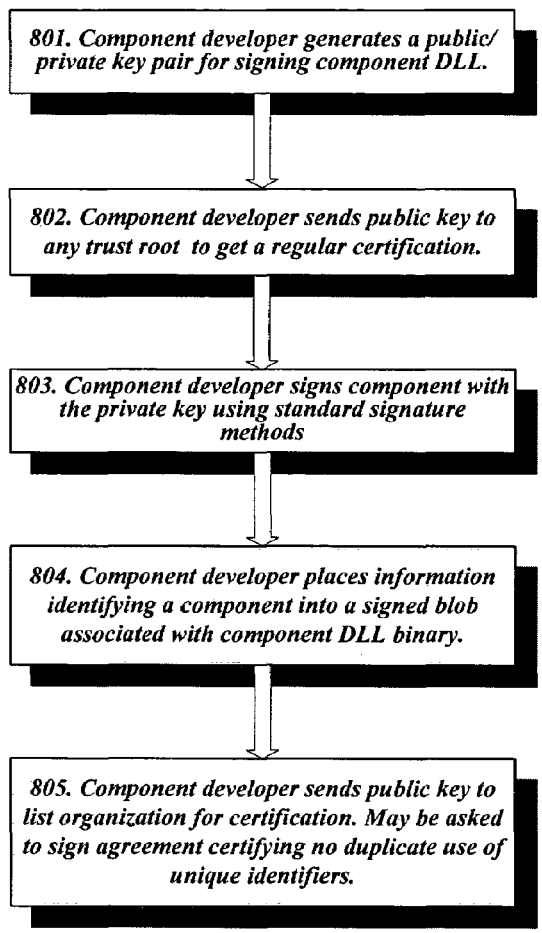
FIG. 8 illustrates an exemplary process for associating a unique identifier with a computing component.

FIG. 8 illustrates an exemplary procedure for how plug-ins 106 can be associated with identification information that allows them to be loaded into a Digital Media Platform 101. In various preferred embodiments, no component is allowed to operate in connection with the Digital Media Platform 101 unless it has been certified by a list organization. A unique identifier is assigned to a component as part of the certification process, and this unique identifier can be matched against a revocation list. FIG. 8 therefore provides a certification process that allows component developers to get a certification and unique identifier for a developed component that they desire to make available for use with a Digital Media Platform 101.

First, the steps of FIG. 8 demonstrate that component developers can get a regular certificate for their component, and sign their component, by following exemplary steps 801 through 803. The component developer can generate a public/private key pair ($K1_{pub}$, $K1_{pri}$) for themselves 801. Next, the component developer can send the public key $K1_{pub}$ to any trust root, for example VERISIGN®, to get a regular certification 802. Next, the component developer can sign each of their components with the private key $K1_{pri}$ using standard signature methods 803. This signature along with the certificate from 802 allows users of the component to confirm that the component really belongs to the said component developer and that it has not been modified after it was created.

The above steps 801 to 803 may be recognizable from other contexts to those of skill in the art. After performing the above steps of 801 to 803, the further steps 804 to 805 may also be required prior to allowing a component to be loaded into a Digital Media Platform 101. As shown in step 804, a developer may be required to place information identifying a component into a signed blob associated with the component Digital Link Library ("DLL"). This blob could be, for example, an XML manifest. The identification information would preferably include a hash of the component, which confirms that the blob is really for an identified component. Other information included in the blob can be a unique identifier, such as a GUID, that is unique to the component, the developer's company name, and other useful information to associate with a component. Remember, the unique identifier will be used to identify a component for a revocation list. This unique identifier may contain any pattern, e.g., vendor name, public key, unique ID, as unique identifier information. Any information that is signed by a trusted root can be used for matching purposes. If desired, the component developer can use the same private key $K1_{pri}$, from step 801 or a new private key $K2_{pri}$ to sign the identification blob.

Finally, the component developer can send the corresponding public key ($K1_{pub}$ or $K2_{pub}$) to a list organization for a separate certification 805. At this point, the list organization may ask component developers to sign an agreement that the identification information provided is correct, that there will be no duplicate use of unique identifiers, and that the component abides by some common compliance rules designed to protect the digital content 206.

The Policy Engine 211 from FIG. 2 trusts the list organization. Therefore a certification 805 from the list organization indicates to the policy engine 211 that the certified component can be safely loaded in a Digital Media Platform 101 and that the identification information does indeed belong to this component and has not been tampered with.

Figure 9:
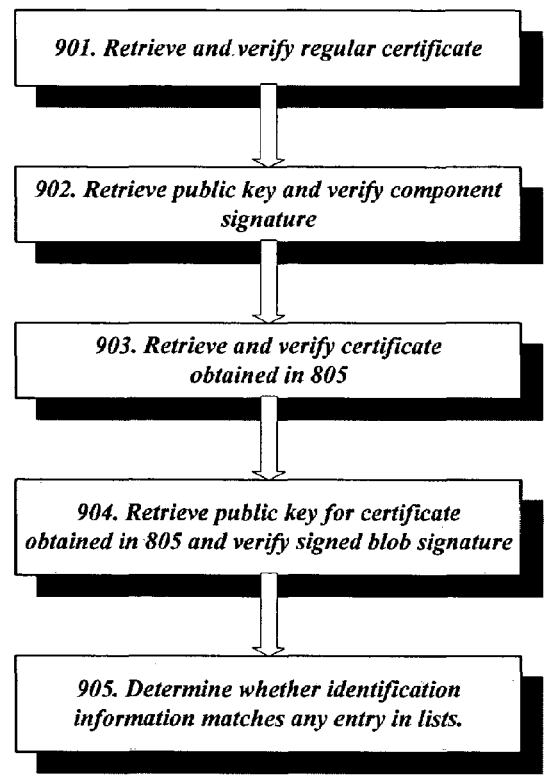
FIG. 9 illustrates an exemplary process for verifying a unique identifier assigned to a component.

FIG. 9 illustrates a process to verify that the information coming from component developers is correct. The steps of FIG. 9 can be carried out by software charged with enforcing a list, such as the policy engine 211 from FIG. 2. First, the policy engine 211 can retrieve the regular certificate obtained in 802 from a component. It verifies the integrity of the certificate using standard methods 901. Next, it can retrieve a component developer's public key from the certificate and uses the public key to verify the signature of a component 902. At this point, if the verifications are successful, the policy engine 211 has ensured that the component developer vouches for the component, and that the component has not been modified since that time.

In the subsequent steps of FIG. 9, the policy engine 211 repeats steps 901 and 902 to verify the identification blob from 804. Specifically, the policy engine 211 can first retrieve the certificate obtained in 805 and verify the integrity of that certificate using standard methods 903. It can then retrieve the component developer's public key from the list organization certificate and use that public key to verify the signature on the identification information 904. As mentioned earlier, the identification information blob preferably contains a hash of the component, which can be used to verify the blob. The policy engine retrieves this hash and then verifies that it matches the component, which in turn confirms that the identification information really corresponds to the component.

Finally, the policy engine 211 can determine whether the identification information in the signed blob matches one of the entries in a revocation list 905. This process can entail checking the unique identifier against both a global revocation list obtained from the list service and an exclusion list from a Digital Media Object 206. As mentioned earlier, the identification information can include a unique GUID, developer's company name, developer's public key etc. Each entry of the revocation list can have a pattern that matches one or more of these fields. This enables the list service or the Digital Medial Object 206 to revoke a specific component (by GUID) or all components from a specific developer or all components signed with a specific key, and so on.

If the identification information of the component matches one of the entries of the revocation list then the policy engine 211 does not allow the component to get access to the content of Digital Media Object 206. This denial itself can be implemented using various mechanisms as will be appreciated by those of skill in the art.

Note that "standard methods" are referred to above in connection with verifying certificates in steps 901 and 903. The act of verifying the integrity of the certificates, originally obtained in 802 or 805 may involve traversing a chain of certificates. This is presently accomplished, for example, by the MICROSOFT WINDOWS CRYPTO® system. Unlike such a system, however, the policy engine 211 for a system as described here may be configured to trust only specific trust roots. This contrasts with the CRYPTO® system, which allows a user of a Personal Computer ("PC") to specify trusted roots. This flexibility may not be desirable here, because this system protects a remote asset, such as Digital Medial Object 206 from the users of PCs.

To summarize the above description of disabling components to protect digital media, a list is used to identify components that will be revoked. The list should be transmitted and stored securely. A trusted process can read the list and take responsibility for revoking the components thereon. Varying degrees of revocation may be specified. A global list can revoke components for all media objects, while any number of supplemental lists can enumerate components to be revoked only for subsets of media objects. The list may also provide information for a user interface that can inform users of revocations, updates to lists, and guide them through replacing disabled components.

Figure 1:
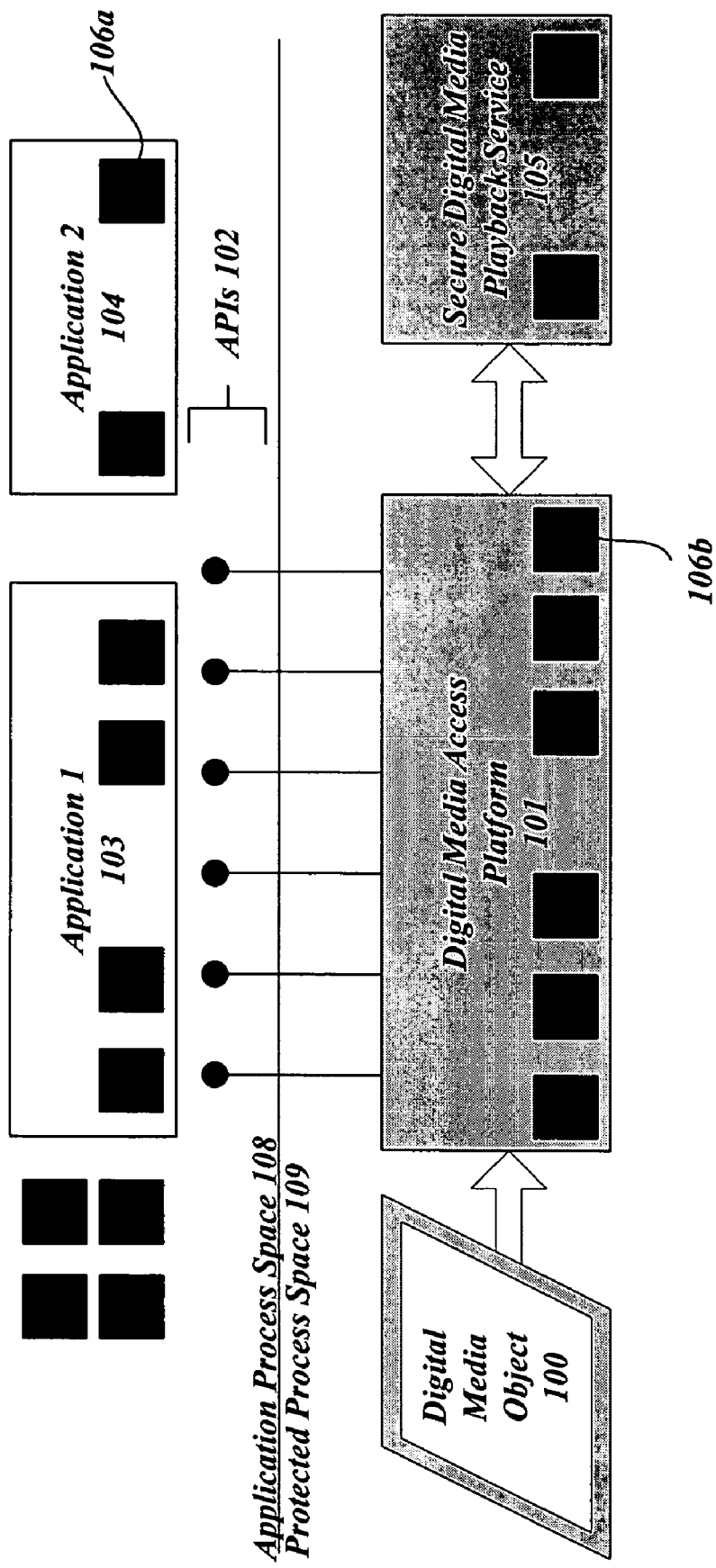
FIG. 1 illustrates the current state of the art in protection of digital media. Digital media protection technology 107 may protect a digital media object 100. The protected object 100 can be accessed by a digital media access platform 101 that incorporates related digital media protection technology 107. Applications 103 and 104 can access the digital media object through the digital media access platform 101. Throughout the process, a digital media object 100 may be exposed to any number of software components 106 that could compromise the digital media protection technology 107.
Figure 10:
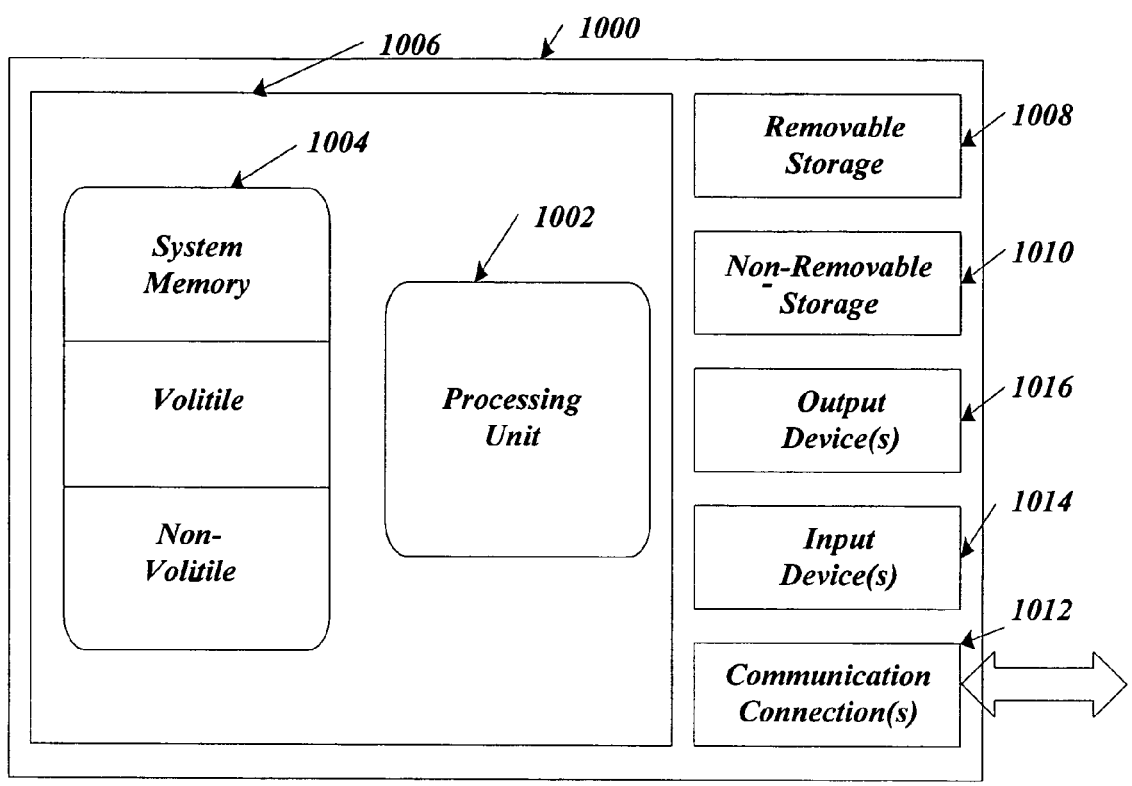
FIG. 10 illustrates a basic computing device 1000 suitable for use with the invention.

A very basic computing device suitable for use in connection with the invention is depicted in FIG. 10. In its most basic configuration, computing device 1000 typically includes at least one processing unit 1002 and memory 1004. Depending on the exact configuration and type of computing device, memory 1004 may be volatile (such as RAM), non-volatile (such as ROM, flash memory, etc.) or some combination of the two. This most basic configuration is illustrated in FIG. 10 by dashed line 1006. Additionally, device 1000 may also have additional features/functionality. For example, device 1000 may also include additional storage (removable and/or non-removable) including, but not limited to, magnetic or optical disks or tape. Such additional storage is illustrated in FIG. 1 by removable storage 1008 and non-removable storage 1010. Computer storage media includes volatile and nonvolatile, removable and non-removable media implemented in any method or technology for storage of information such as computer readable instructions, data structures, program modules or other data. Memory 1004, removable storage 1008 and non-removable storage 1010 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 1000.

Device 1000 may also contain communications connection(s) 1012 that allow the device to communicate with other devices. Communications connection(s) 1012 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 1000 may also have input device(s) 1014 such as keyboard, mouse, pen, voice input device, touch input device, etc. Output device(s) 1016 such as a display, speakers, printer, etc. may also be included. All these devices are well known in the art and need not be discussed at length here.

Computing device 1000 typically includes at least some form of computer readable media. Computer readable media can be any available media that can be accessed by 1000. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by 1000. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Finally, it should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the user interface techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments refer to utilizing the present invention in the context of one or more stand-alone computer systems, the invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes. Therefore, the present invention should not be limited to any single embodiment, but rather should be construed in breadth and scope in accordance with the appended claims.

What is claimed:

1. A computer readable medium comprising computer executable instructions for disabling and replacing computing components, said instructions comprising:

instructions for a policy engine that reads at least one list of computing components that are used in circumventing digital media protection technology, said list identifying at least one computing component for global revocation and a Uniform Resource Locator ("URL") for use in replacing said at least one computing component;

instructions for disabling by said policy engine said at least one computing component on said at least one list of computing components that are used in circumventing digital media protection technology, in response to an attempt to access a digital media object comprising at least one of a movie, song, book, illustration, photograph, or useful collection of data; and instructions for assisting in replacing the at least one computing component, comprising instructions for accessing said URL in said list of computing components.

2. A computer readable medium according to claim 1, further comprising instructions for acquiring at least one updated list of computing components.

3. A computer readable medium according to claim 2, further comprising instructions for engaging a secure transmission protocol to ensure that said at least one updated list is authentic.

4. A computer readable medium according to claim 1, further comprising instructions for checking a signature of the at least one computing component prior to allowing said at least one computing component to operate in connection with a process for rendering digital media objects.

5. A computer readable medium according to claim 1, wherein said at least one list of computing components comprises at least one second list of computing components to be disabled only when a digital media object associated with the second list is accessed.

6. A computer readable medium according to claim 1, further comprising instructions for providing an opportunity to carry out said instructions for disabling, wherein if said opportunity is not selected then access to a media object is denied.

7. A method for preventing unauthorized access to digital media, comprising:

maintaining a list of computing components that are used in circumventing digital media protection technology, said list identifying at least one computing component for global revocation and a Uniform Resource Locator ("URL") for use in replacing said at least one computing component, and identifying at least one computing component for limited revocation, and farther identifying a secure clock time; and distributing said list of computing components to consumers of digital media objects, wherein said list of computing components is distributed in a computer readable medium.

8. A method according to claim 7, further comprising distributing software that reads said secure clock time and automatically initiates retrieval of said list of computing components.

9. A method according to claim 7, wherein said list of computing components indicates that said at least one computing component for global revocation should be disabled for use with all digital media objects.

10. A method according to claim 7, wherein said list of computing components indicates that said at least one computing component for limited revocation should only be disabled for use with digital media objects from a specified source.

11. A method according to claim 7, wherein said list of computing components is bundled with a digital media object and identifies at least one computing component for limited revocation only when the bundled digital media object is accessed.

12. A method according to claim 7, further comprising distributing software that automatically initiates replacement of at least one computing component on said list of computing components using said URL.

13. A method according to claim 7, further comprising distributing an empty list of computing components for the purpose of updating the an age of a previously distributed list of computing components.

14. A method according to claim 7, further comprising prompting a user to authorize disabling one or more computing components on said list, wherein if said opportunity is not selected, access to one or more media objects is denied.

15. A computer readable storage medium, comprising:
a digital media object; and
a list of computing components, said list being individually associated with said digital media object, wherein at least one computing component on said list is used in circumventing digital media protection technology and is prohibited from executing when said digital media object is accessed on a computer system equipped with a policy engine and secure digital media access platform.

16. A computer readable storage medium, comprising:
a digital media object; and
information specifying a maximum age of a list of computing components that are used in circumventing digital media protection technology and are prohibited from executing when said digital media object is accessed on a computer system equipped with a policy engine and secure digital media access platform.

17. A computer readable storage medium having computer executable instructions for protecting rights in digital media, comprising:
instructions for acquiring by a policy engine a list of computing components that are used in circumventing digital media protection technology provided by a digital media access platform; and
instructions for disabling at least one computing component on said list of computing components.

18. A computer readable storage medium according to claim 17, wherein said list of computing components is associated with a digital media object.

19. A computer readable storage medium according to claim 17, wherein said list of computing components comprises at least one computing component that said instructions for disabling will disable for all digital media objects.

20. A computer readable storage medium according to claim 17, further comprising instructions for recognizing unique identifiers for all computing components in a digital media rendering process, wherein said unique identifiers comprise any field or combination of fields associated with a computing component.

21. A computer readable storage medium according to claim 17, further comprising instructions for retrieving at least one updated list of computing components.

22. A computer readable storage medium according to claim 17, further comprising instructions for acquiring at least one replacement component on said list of computing components.

23. A computer readable storage medium according to claim 17, further comprising instructions for blocking access to at least one media object unless one or more components on said list of computing components is disabled.

24. A method for protecting digital media objects, comprising:
receiving by a policy engine a list of computing components that are used in circumventing digital media protections provided by a digital media access platform;
revoking at least one computing component identified for global revocation on said list;
verifying signatures associated with said computing components, said signatures demonstrating that the computing components are certified; and
allowing only certified computing components to operate in connection with a system for rendering digital media objects by revoking any uncertified computing component.

25. A method according to claim 24, further comprising not permitting a computing component to operate in connection with said system for rendering digital media objects when said verifying indicates that the computing component or information identifying the computing component does not correlate to a signature associated with the computing component.

26. A method according to claim 24, further comprising transmitting a list of computing components identifying at least one computing component that may no longer operate in connection with said system for rendering digital media objects.

27. A method according to claim 26, wherein said transmitting is done using a secure transmission protocol.

28. A method according to claim 24, further comprising enforcing a list of computing components associated with a single digital media object, wherein said list of computing components indicates at least one computing component that may not operate in connection with said system for rendering digital media objects when said single digital media object is rendered by said system for rendering digital media objects.

29. A method according to claim 24, further comprising enforcing a list of computing components associated with a plurality of digital media objects from a single source, wherein said list of computing components indicates at least one computing component that may not operate in connection with said system for rendering digital media objects when any of said plurality of digital media objects from a single source is rendered by said system for rendering digital media objects.

* * * * *